Patented Oct. 16, 1945

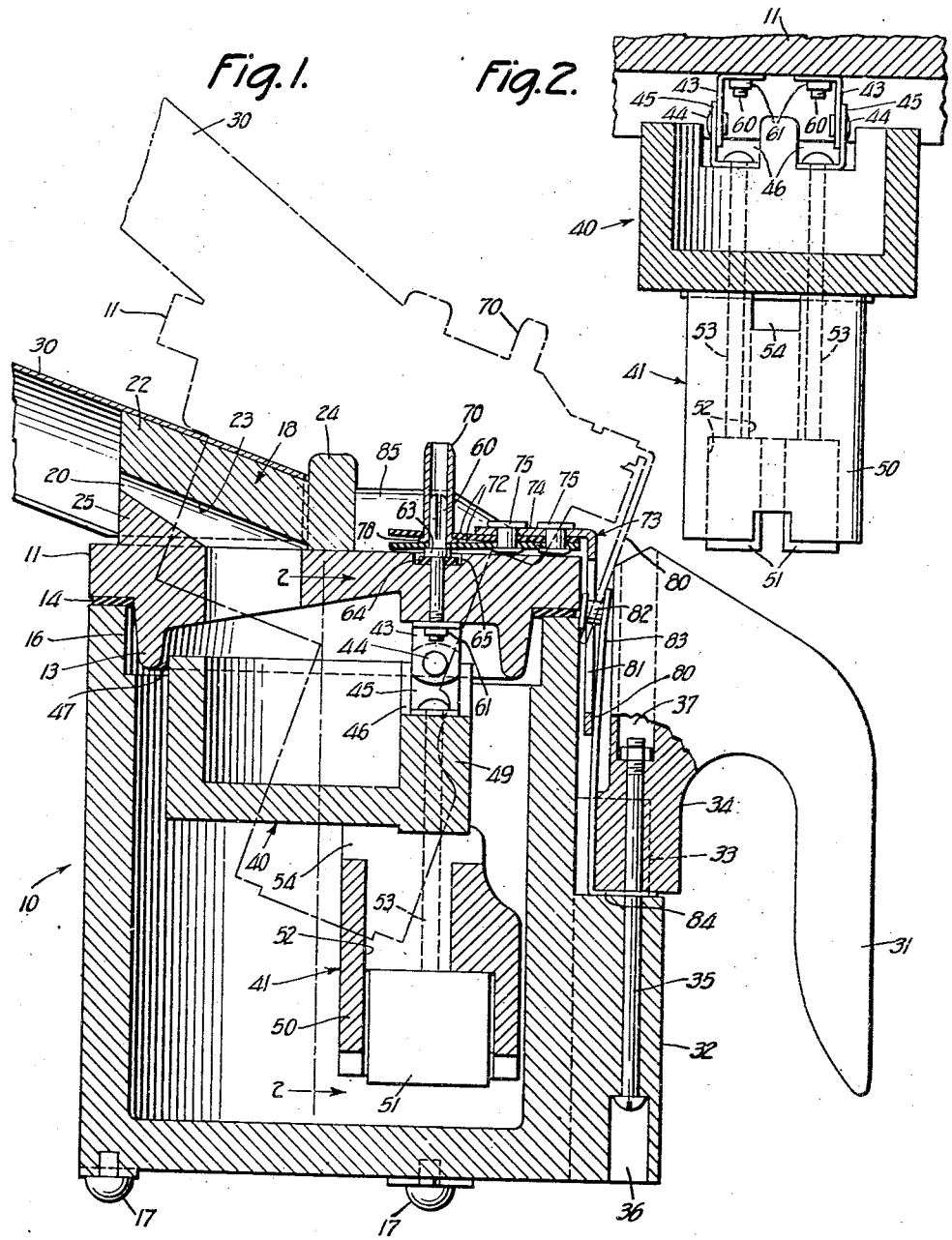

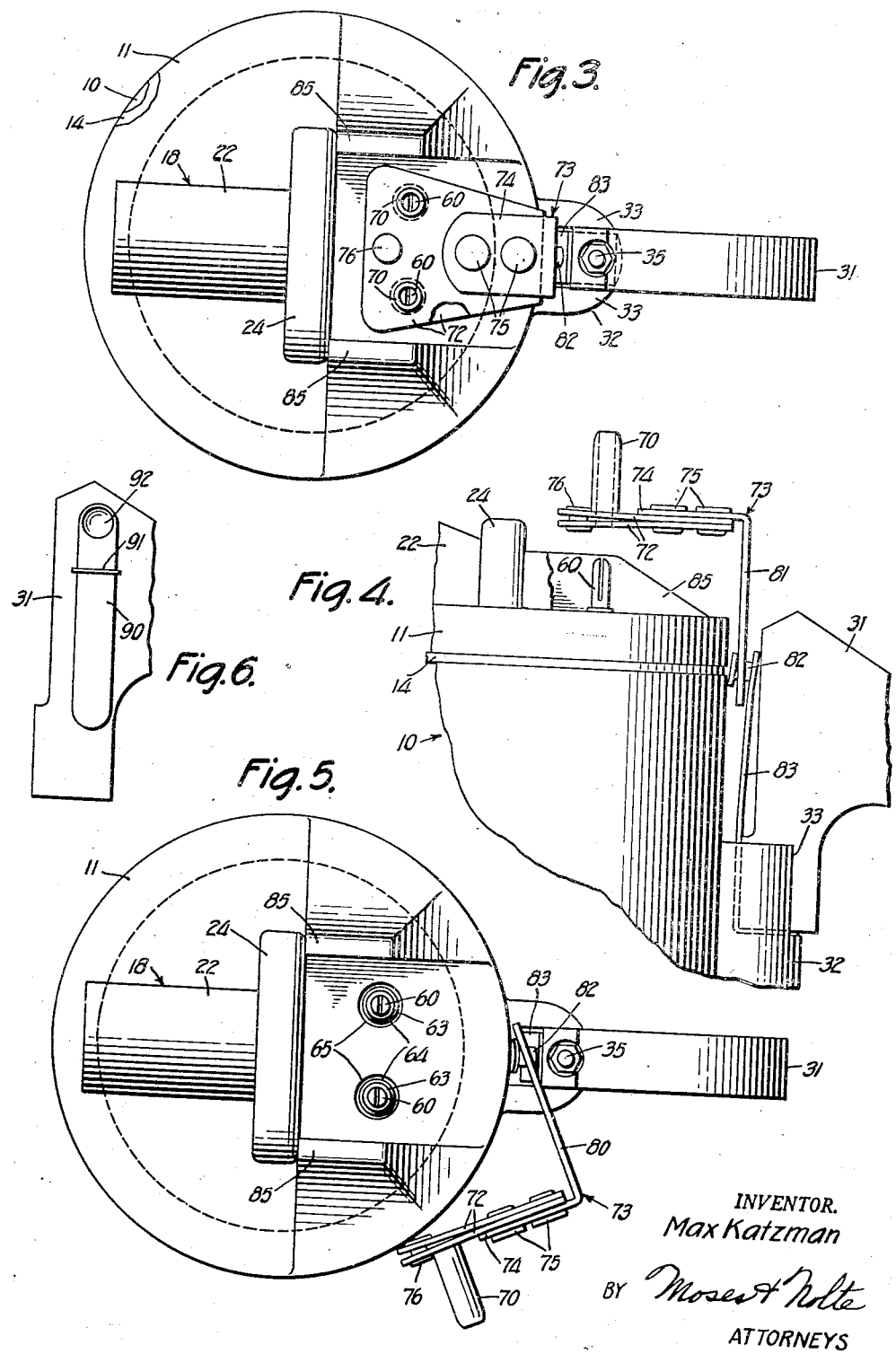

2,387,155

UNITED STATES PATENT OFFICE 2,387,155

ELECTRIC VAPORIZER

Max Katzman, Brooklyn, N. Y.

Application April 28, 1943, Serial No. 484,848

13 Claims. (Cl. 219—40)

The present invention relates to vaporizers of the type employed to electrically vaporize liquids and to liberate the vapors within a room or other confined space. Although the vaporizer of the present invention has a wide range of utility, it is particularly adapted to vaporize medicated liquids for inhalation in the treatment of respiratory ailments or to vaporize deodorant or disinfectant liquids.

In electric vaporizers of the general type referred to, there is provided a jar adapted to contain the liquid to be vaporized, a removable lid for said jar, an electric heater depending from the underside of said lid, having suitable electrodes to be submerged in the jar liquid, and terminals for said heater secured to the upper side of the lid for connection to an electric plug. If a person removes the lid while the heater is electrically connected, he may receive an electric shock.

One object of the present invention is to provide a new and improved electric vaporizer which is safe and proof against electric shock.

Another object is to provide an electric vaporizer having a lid which is locked in a new and improved manner against removal from the jar as long as the electric plug is electrically secured to the heater terminal on said lid, but which can be easily and expeditiously released and removed to permit convenient access to the interior of the jar or to the heater after said plug is disconnected from the terminals on said lid.

A further object is to provide an electric vaporizer having a lid which is locked to the jar even after the electric plug is detached, but which can be released by a simple manipulation, after the plug is disconnected.

Another object is to provide an electric vaporizer having the shock-proof features above referred to, without the requirements of a frame, base or stand for supporting the jar, and without the necessity of making the electric plug an inseparable part of the vaporizer unit.

A further object is to provide an electric vaporizer having a new and an improved structural connection between the lid locking means and the vaporizer handle.

Various other objects, features and advantages of the invention will be apparent from the following particular description, and from an inspection of the accompanying drawings, in which Fig. 1 is a fragmentary vertical section of an electric vaporizer embodying the present invention and shown with its lid in locked position;

Fig. 2 is a vertical section of a portion of the electric vaporizer taken on line 2—2 of Fig. 1;

Fig. 3 is a top plan view of the electric vaporizer shown with the electric plug disconnected but the lid still locked;

Fig. 4 is a fragmentary side elevation of the electric vaporizer shown with the lid locking means in the process of being released;

Fig. 5 is a top plan view of the electric vaporizer shown with the lid locking means entirely released; and Fig. 6 is a fragmentary side elevation of a vaporizer handle shown carrying a salt spoon as an alternative form of the invention.

Referring to the drawings, the electric vaporizer of the present invention comprises a jar 10 open at the top and made of any suitable insulating material such as porcelain. The open top of the jar 10 is closed by a cover or lid 11 which is also desirably made of porcelain, but which can be made of any other suitable material. This lid 11 seats freely on the top rim of the jar 10 and is provided on its underside with an annular rib or flange 13 embraced by a gasket 14 of suitable sealing material such as rubber serving as a packing for the joint between the jar 10 and the lid 11. This rib 13 serves to retain the gasket 14, to reinforce the lid 11, and to weigh down the lid 11 for effective sealing of said lid on the jar. It also serves as a baffle for the vapor in its passage towards the outlet of the vaporizer as will be made apparent. The upper end of the jar 10 is desirably provided with an annular internal recess 16 to permit the use of a rib 13 of maximum diameter, and to afford maximum head space at the upper section of said jar.

The bottom of the jar 10 is desirably provided with means to prevent injury to a table or other supporting member. This means is shown in the form of pins 17 provided with shanks retained in respective recesses in the bottom of the jar 10 and projecting heads desirably of padding material such as rubber adapted to rest on a supporting surface.

A vapor discharge nozzle 18 on the upper side of the lid 11 is provided with an inclined opening 20 communicating with the interior of the jar 10 and tapering as shown to discharge vapor at high speed. This nozzle 18 is desirably formed by a spout member 22 provided with a recess 23, and a rear flange 24, and glazed, cemented or otherwise made rigid with the top of the lid 11. The lid 11 has integral therewith a tapering tenon 25 extending snugly into the spout recess 23 and glazed or otherwise rigidly retained in said recess.

This tenon 25 defines with the recess 23 the tapering nozzle opening 20.

A nozzle extension 30 desirably of metal and longitudinally split along its lower side is frictionally retained on the nozzle 18 to direct the discharged vapors in the desired directions at a distance from the vaporizer. This nozzle extension 30 permits a person to inhale concentrated medicated vapors directly as they are discharged from said extension. These vapors are discharged from the extension 30 at a speed reduced sufficiently from the nozzle outlet speed to permit convenient inhalation. Where the vaporizer is not to be used for direct inhalation, but is to be employed, for example, to vapor treat the air in a room, the extension 30 may be dispensed with.

A handle 31 is provided rigid with the jar 10, and made of any suitable strong material such as wood or plastic. For securing the handle 31 to the jar 10, there is provided a handle support 32 integral or otherwise rigid with the rear lower side of said jar along the length thereof. The upper section of this handle support 32 is slotted to form furcations 33 snugly flanking the lower portion of the handle frame 34 seated on said support. A long bolt 35 extends through the handle support 32 and handle frame 34 to firmly secure the handle 31 to said support. Recesses 36 and 37 in the handle support 32 and handle frame 34 respectively serve to conceal the head and nut of bolt 35 while rendering these easily accessible for bolt removal.

Suspended from the lid 11 and forming a unitary assembly therewith is a cup or receptacle 40 and a heater 41. The receptacle 40, which is of suitable insulating material such as porcelain, is adapted to contain respiratory medicant, deodorant, antiseptic or other ingredients to be ejected with the steam vapors generated in the vaporizer, and serves to keep these ingredients away from the heater 41 and the carrier liquid to be vaporized, as set forth in my United States Patent No. 2,051,719, issued August 18, 1936. This receptacle 40 is hingedly fastened to the underside of the lid 11. For that purpose, there is secured to the underside of the lid 11 by means to be described a pair of metal angles 43, having respective depending flanges pivotally connected at 44 to the upstanding flanges of metal angles 45 retained in recesses 46 of the receptacle 40 and fixed to said receptacle in a manner to be described. In normal operating position of the vaporizer shown in Fig. 1, the rib 13 encircles the rim of the receptacle 40, and extends slightly below said rim to form therewith a restricted annular passageway 47 between said rib and said rim. This arrangement assures passage of the steam vapors over the medicant or other ingredients contained in the receptacle 40 and thereby prevents the vapors from being by-passed into the nozzle opening 20 before it has had a chance to pick up the necessary ingredients from said receptacle.

The receptacle 40 is of cylindrical shape except for a flat chordal rear side 49 which is desirably of increased thickness to mount conveniently the hinge members 43 and 45, and to receive the fastening pins 53 to be described.

The electrical heating unit 41 includes a tubular frame 50 of suitable insulating material such as porcelain, shown of substantially rectangular cross-section and held against the underside of the receptacle 40 in a manner to be described. Two heating electrodes 51 made of carbon, steel or other similar electrical conductive material and shown of rectangular block form are retained in the hollow 52 of the heater frame 50 and are interspaced to permit flow of liquid or vapor upwardly into said frame hollow. A transverse opening 54 in the heater frame 50 communicates with its central hollow 52 to form a circulatory passageway for the carrier liquid or vapors as set forth in my Patent No. 2,051,719.

The electrodes 51 are secured to the frame 50 by means of metal fastening members 53 passing through the walls of the receptacle 40 and the heater frame 50 and affixed to said electrodes. These fastening members 53 are shown in the form of long pins having respective heads at their upper ends and frictionally secured to the electrodes 51 at their lower ends in a manner as described and claimed in my copending application, Serial No. 484,849, filed April 28, 1943. These pins 53 serve not only as fastening means for the heater unit 41, but also serve to conduct electricity to the heater electrodes 51 and to fasten the hinge angles 45 to the receptacle 40. These hinge angles 45 as well as the hinge angles 43 also conduct electricity to the heater 41, and conjointly form part of the heater circuit in series with the fastening pins 53.

The upper hinge angles 43 are electrically connected to terminals 60 on the outside of the vaporizer. These terminals 60 in the form of pins pass through the lid 11 and are anchored at their lower ends by threaded portions 61 on the hangers 43, while the upper ends of the terminals project upwardly beyond the lid 11. A flange 63 on each of the terminals 60 seats on an insulating washer 64 in a recess 65 on the upper side of the lid 11, and is firmly clamped against said washer by the portion 61. The pins 60 serve not only as terminals for the heater 41, but also serve to fasten the hinge angles 43 in position.

As an important feature of the present invention, means are provided for locking the lid 11 against removal while the terminals of the vaporizer are electrically inserted in an electric plug, or are in dimensional condition for electrical connection to the plug. For that purpose, the terminals 60 are made too small in length and diameter to electrically engage the ordinary household electric plug. Therefore, as long as the terminals 60 remain exposed, there is no possibility of making electrical connection therewith through the ordinary household plug. To permit such electrical connection to be made conveniently, there is provided a pair of tubular conductor prongs 70 adapted to be slipped over the terminals 60 and externally dimensioned for effective electrical connection to the conventional electric plug. These conductor prongs 70 have their hollows dimensioned to snugly receive the terminals 60. To assure a more effective electrical connection, the terminals 60 have their upper projecting sections forked to effect resilient engagement of the terminal branches with the prongs 70.

As long as the prongs 70 are slipped over the terminals 60, the lid 11 is locked against removal from the jar 10. For this purpose, the prongs 70 are carried on a support comprising a base 72 of insulating material to which said prongs are fastened, and an angular bracket 73 secured to said base. This base 72 is shown comprising two superposed insulating sheets fastened at their rear ends to one arm 74 of the bracket 73 by rivets 75, and fastened together at their forward ends by a rivet 76. These base sheets 72 are formed with aligned apertures to permit free passage of the terminals 60 therethrough. The prongs 70 extend only through the apertures of the upper base sheet and have flange bases 78 retained between the two base sheets, so that these prong bases are protected by the insulating properties of said sheets.

The bracket 73 is of substantially right angular shape, and has a depending leg or arm 80 extending between the handle frame 34 and the jar 10, and formed with an elongated slot 81 for loosely receiving a headed pin or stud 82 secured to a post or stand 83. This post 83 forms one arm of an angle, the other arm 84 of which is clamped between the handle frame 34 and the handle support 32 and is held in position by the bolt 35 passing therethrough.

The bracket 73 can be translated upwardly from the position shown in Fig. 1 to the inoperative position shown in Fig. 4 in which the prongs 70 are out of engagement with the terminals. When the bracket 73 is in its lowermost operative position shown in Fig. 1, the conductor prongs 70 are socketed over the terminals 60 and are in position to receive the socket terminals of the ordinary household electric plug connected to one end of a flexible conductor cord, the other end of which has the usual plug for connection to a current outlet. As long as the conductor prongs 70 are in operative position shown in Fig. 1, the lid 11 cannot be removed from the jar 10 to a sufficient extent to expose the interior thereof or to expose the receptacle 40 and heater 41 forming a unit with said lid, so that a person cannot accidentally receive a shock by inadvertently tampering with the lid while the plug is attached to the prongs 70. By moving the lid 11 upwardly in limiting position as determined by the engagement of the stud 82 with the base of the bracket slot 81, the lid 11 with appurtenances 40 and 41 attached thereto can be tilted in the position shown in dot and dash lines in Fig. 1. In this tilted position, the bracket arm 80 engaging the stud 82 and the upper end of the handle frame 34 limits further angular movement of the lid 11. In this extreme tilted position of the lid 11, the interior of the jar 10 as well as the receptacle 40 and heater 41 are still inaccessible so that the user cannot accidentally come in contact with anything in the interior of the jar 10 that may give him a shock.

The lid 11 can only be entirely removed from the jar 10 after the prongs 70 have been disconnected from the terminals 60. To remove the lid 11 the prongs 70 are lifted from the terminals 60 into limiting position shown in Fig. 4, and then angularly turned into the position shown in Fig. 5 in which the prongs 70 and their supporting bracket 73 are in position to permit free removal of the lid 11 with attached receptacle 40 and heater 41. The interior of the jar 10 can then be cleaned or refilled with water for use, and the receptacle 40 cleaned or refilled with medicants or whatever other ingredients are intended to be ejected with the generated steam vapors.

In order to further render the vaporizer safe against accidental shock, the lid 11 is formed on its upper side with upstanding flanges 85 flanking the terminals 60 and forming with the spout flange 24 a protective wall around three sides of said terminals 60. These projective flanges 24 and 85 are spaced a sufficient distance from the prongs 70 in their operative position to permit the electric plug to be attached freely to said prongs 70 or easily detached therefrom.

It should be noted that the locking of the lid 11 against accidental removal while electrically connected is effected without the necessity of making the electric plug a permanent unit with the vaporizer, and without the necessity of frames, bases or stands for supporting the jar or the lid locking means. This reduces the amount of metal necessary for the vaporizer, and thereby reduces the weight of the vaporizer and its cost of manufacture, and also renders it safer and more convenient to handle.

To the water in the jar 10 must be added a pinch of salt to make said water electrically conductive. If too much salt is added, the water will foam excessively, and may boil over into the receptacle 40. In Fig. 6 is shown a modified construction in which the handle 31 of the vaporizer carries a spoon 90 for measuring the salt, so that the addition of the right amount of salt is assured. Furthermore, the presence of the spoon in full view with an indicia thereon that it is a salt spoon is a constant reminder that salt must be added to the water before vaporization can begin.

The salt spoon 90 is secured to the side of the handle 31 by means of a staple 91 driven into said handle. The spoon is of sheet metal with one end 92 dished to form a shallow bowl for the salt. The engagement of the convex side of the spoon bowl 92 with the side of the handle 31, and the engagement of the spoon handle with the staple 91 serves to frictionally retain the spoon in said staple against accidental removal, while permitting said spoon to be easily removed for salt measuring purposes.

I have described what I believe to be the best embodiments of my invention. I do not wish, however, to be confined to the embodiments shown, but what I desire to cover by Letters Patent is set forth in the appended claims.

I claim:

1. An electric vaporizer comprising a jar adapted to contain the liquid to be vaporized, a lid for said jar, an electric heater suspended from said lid and provided with terminals on the upper side of said lid, conductor prongs adapted to engage said terminals and to receive a separate plug, and means for supporting said prongs for translational movement in and out of engagement with said terminals, and for angular movement to and from the upper side of said lid, said prong supporting means locking said lid against removal while said prongs engage said terminals, and permitting said lid removal while said prong supporting means are in angular position away from the upper side of said lid.

2. An electric vaporizer comprising a jar adapted to contain the liquid to be vaporized, a lid for said jar, an electric heater suspended from said lid and provided with terminals on the upper side of said lid, conductor prongs adapted to engage said terminals and to receive a separate plug, and a bracket for supporting said prongs mounted to permit movement of said prongs in and out of engagement with said terminals and towards and away from the upper side of said lid.

3. An electric vaporizer comprising a jar adapted to contain the liquid to be vaporized, a lid for said jar, an electric heater suspended from said lid and provided with terminals on the upper side of said lid, an angle bracket having an arm extending over said lid and the other arm along the side of said jar, means for supporting said bracket for translational movement transversely of said lid towards or away from said lid and for pivotal movement towards and away from the upper side of said lid, and prongs carried by said first-mentioned bracket arms and adapted to be moved by said bracket into and out of engagement with said terminals, said prongs being adapted to receive a separate electric plug when said prongs are in engagement with said terminals.

4. An electric vaporizer comprising a jar adapted to contain the liquid to be vaporized, a lid for said jar, an electric heater suspended from said lid and provided with terminals on the upper side of said lid, a handle on one side of said jar, an angle bracket having an arm extending over said lid and the other arm along the side of said jar between said handle and said jar, means between said jar and said handle for supporting said bracket for translational movement transversely of said lid and for pivotal movement towards or away from the upper side of said lid, and prongs carried by said first-mentioned bracket arm and adapted to be moved by said bracket into and out of engagement with said terminals, said prongs being adapted to receive a separate electric plug when said prongs are in engagement with said terminals.

5. An electric vaporizer comprising a jar adapted to contain the liquid to be vaporized, a lid for said jar, an electric heater suspended from said lid and provided with terminals on the upper side of said lid, an angle bracket having an arm extending over said lid and the other arm along the side of said jar, prongs carried by said first-mentioned bracket arms and adapted to receive a separate electric plug, and a post on the side of said jar for supporting said bracket and having a pin and elongated slot connection with said second-mentioned bracket arm permitting translational movement of said prongs in and out of engagement with said terminals and angular movement of said bracket in a direction to bring said first-mentioned arm to one side of said lid.

6. An electric vaporizer comprising a jar adapted to contain the liquid to be vaporized, a lid for said jar, an electric heater suspended from said lid and provided with terminal pins extending upwardly from said lid, a handle on one side of said jar, an angle bracket having an arm extending over said lid and the other arm along the side of said jar between said handle and said jar, a post between said jar and said handle having a pin and elongated slot connection with said second-mentioned bracket arm, and tubular prongs carried by said first-mentioned bracket arm and adapted to be moved by said bracket into and out of embracing engagement with said terminal pins, said prongs being adapted to receive a separate electric plug when said prongs are in engagement with said terminal pins.

7. An electric vaporizer comprising a jar adapted to contain the liquid to be vaporized, a lid for said jar, an electric heater suspended from said lid and having terminals extending from the upper side of said lid, a handle for said jar, a support for said handle rigid with the side of said jar, a post on one side of said jar having a base clamped between said handle and said support, conductor prongs, and a bracket for supporting said prongs mounted on said post for movement of said prongs in and out of engagement with said terminals, said prongs being adapted to be connected to a separate electric plug, said bracket locking said lid against removal while said prongs are in engagement with said terminals.

8. In an electric vaporizer, a jar adapted to contain the liquid to be vaporized, and having integral therewith along the lower section of one side thereof a projection bifurcated at its upper end, a handle for said jar having a frame section seated on the upper end of said jar projection and snugly retained between the branches of the bifurcation on said projection, and a bolt passing through said handle frame and said jar projection for firmly securing said handle to said projection.

9. In an electric vaporizer, a jar adapted to contain the liquid to be vaporized, and a lid for said jar having integral with the upper side thereof a tenon, and a spout having a slot snugly receiving said tenon, said tenon defining with said slot a tapering nozzle discharge opening communicating with the interior of said jar.

10. In an electric vaporizer, a jar adapted to contain the liquid to be vaporized, a lid for said jar having integral with the upper side thereof a tenon, a spout having a seat snugly receiving said tenon, said tenon defining with said slot a tapering nozzle discharge opening communicating with the interior of said jar, said spout having integral therewith a flange at one end thereof opposite from the discharge end of said spout, said lid having integral with the upper side thereof a pair of flanges extending from opposite ends of said first-mentioned flange, and a heater suspended from said lid and having terminals projecting upwardly from the upper side of said lid and confined within said flanges in protective relationship therewith.

11. In an electric vaporizer, a jar adapted to contain the liquid to be vaporized, a lid for said jar having an annular rib on its underside adapted to extend into the interior of said jar, and a receptacle movably connected to the underside of said lid and adapted to extend into said jar, said receptacle in operative position having its rim extending in proximity to said rib and spaced radially inwardly therefrom to permit the generated vapors to pass between said receptacle and said rib, said lid having a discharge opening over said receptacle in operative position thereof.

12. In an electric vaporizer, a jar adapted to contain the liquid to be vaporized, a lid for said jar having an annular rib on its underside spaced radially inwardly from the periphery of said lid to form a jar seating annular section, said rib being adapted to extend into the interior of said jar, a gasket around said rib seated on the jar rim, and a receptacle hinged to the underside of said lid and adapted to extend into said jar, said receptacle in operative position having its rim extending in proximity to said rib and spaced radially inwardly therefrom to permit the generated vapors to pass between said receptacle and said rib, said lid having a discharge opening over said receptacle in operative position thereof.

13. In an electric vaporizer, a handle for said vaporizer, and means for removably supporting a spoon for measuring a predetermined amount of salt on said handle, said means being incapable of accommodating the conventional spoon.

MAX KATZMAN.